(12) United States Patent
Lei et al.

(10) Patent No.: US 7,835,270 B2
(45) Date of Patent: Nov. 16, 2010

(54) METHOD FOR MANAGING VIRTUAL ROUTER REDUNDANCY PROTOCOL BACKUP GROUPS

(75) Inventors: Yikang Lei, Shenzhen (CN); Yi Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 11/564,709

(22) Filed: Nov. 29, 2006

(65) Prior Publication Data

US 2007/0153765 A1 Jul. 5, 2007

(30) Foreign Application Priority Data

Nov. 30, 2005 (CN) ........................ 2005 1 0126122

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................ 370/220; 370/216; 370/221; 714/2; 714/4

(58) Field of Classification Search ................. 714/1–4; 370/216–221, 225
See application file for complete search history.

(56) References Cited

U.S. PATENT DOCUMENTS

| 5,473,599 | A | 12/1995 | Li et al. | 370/16 |
|---|---|---|---|---|
| 6,910,148 | B1 * | 6/2005 | Ho et al. | 714/4 |
| 7,209,435 | B1 * | 4/2007 | Kuo et al. | 370/219 |
| 7,486,610 | B1 * | 2/2009 | Bhupalam et al. | 370/216 |

(Continued)

FOREIGN PATENT DOCUMENTS

CN 1533108 9/2004

(Continued)

OTHER PUBLICATIONS

European Search Report for DE 06125168.2-2416, dated Mar. 1, 2007.

(Continued)

*Primary Examiner*—Alpus H Hsu
*Assistant Examiner*—Jeremy Costin
(74) *Attorney, Agent, or Firm*—Marshall, Gerstein & Borun LLP (57) ABSTRACT

A method for managing Virtual Router Redundancy Protocol (VRRP) backup groups includes: setting a VRRP Group Management Protocol (VGMP) group including at least one VRRP management group. Each VRRP management group includes at least one VRRP member, and the VRRP members belonging to one VRRP management group belong to different VRRP backup groups respectively; the VGMP group manages the included VRRP management groups uniformly. Embodiments of the invention manage multiple VRRP backup groups in devices based on the new VGMP protocol, and can guarantee the state consistency of multiple VRRP backup groups so as to realize reliable transmission of services requiring the consistency of to-and-fro paths. Meanwhile, embodiments of the invention can decrease the switching delay of the VRRP so as to meet the demands of telecommunication level carrier network when the VRRP is employed to perform route backup.

11 Claims, 5 Drawing Sheets

U.S. PATENT DOCUMENTS

| | | | |
|---|---|---|---|
| 2002/0186653 A1* | 12/2002 | Jensen | 370/219 |
| 2003/0126268 A1* | 7/2003 | Berthaud et al. | 709/229 |
| 2004/0021652 A1 | 2/2004 | Abe et al. | 345/204 |
| 2005/0111352 A1* | 5/2005 | Ho et al. | 370/219 |
| 2005/0141499 A1* | 6/2005 | Ma et al. | 370/389 |

FOREIGN PATENT DOCUMENTS

| WO | WO-2004/021652 A2 | 3/2004 |
|---|---|---|
| WO | WO 2004/084499 | 9/2004 |

OTHER PUBLICATIONS

European Office Action for Application No. 06125168.2-2416, dated Oct. 16, 2007.

International Search Report for International Application No. PCT/CN2006/003008, dated Feb. 22, 2007.

\* cited by examiner

METHOD FOR MANAGING VIRTUAL ROUTER REDUNDANCY PROTOCOL BACKUP GROUPS

CROSS-REFERENCE TO RELATED APPLICATION

This application claims the benefit of Chinese Patent Application No. 200510126122.6, which was filed on Nov. 30, 2005, the entire disclosure of which is hereby incorporated herein by reference.

BACKGROUND OF THE DISCLOSURE

1. Field of the Invention

The present invention relates to the field of network communications technology, and in particular, to a method for managing Virtual Router Redundancy Protocol (VRRP) backup groups.

2. Background of the Invention

In order to realize reliable access of a local area network to an external network, two or more routers are generally employed as a gateway, via which the internal host of the local area network accesses the external network, so as to provide backup for each other. According to the VRRP, two or more routers constitute a virtual router which provides a uniform virtual Internet Protocol (IP) address and a corresponding virtual Media Access Control (MAC) address. In this way, an internal host needs only to set one gateway, i.e., the IP address of the VRRP backup group. As long as any one of the routers constituting the virtual router operates normally, the router may transmit packets from the internal network to the external network as an inter-network device; thus the normal operation of the network is guaranteed.

In the VRRP, all routers constituting a virtual router are called by a joint name, which is a VRRP backup group; and each of the routers in the VRRP backup group is called a VRRP backup group member. As a VRRP backup group member, the router has three states.

Initialize: corresponding interfaces configured with VRRP have not been started, the purpose of this state is to wait for a Startup event.

Master: the member is in the state of transmitting packets. The VRRP backup group member in the Master state is called a master member or a master device. While in the Master state the router functions as the forwarding router for the IP address and the MAC address associated with the virtual router and periodically sends a advertisement t packet to inform backup devices of keeping monitoring.

Backup: the purpose of the Backup state is to monitor the availability and state of the Master Router. The member in this state receives the advertisement packet from the master device, if the advertisement packet has not been received for a specific number of intervals, the member in the Backup state becomes the master device according to the priority thereof and begins transmitting packets. The VRRP backup group member in the Backup state is called a backup member or a backup device.

In a VRRP backup group, only one device is in the Master state and in charge of transmitting packets, the other devices are all in the Backup state and ready for replacing the master device to transmit packets at any moment according to their priorities. One physical device can be a member of multiple VRRP backup groups, and may be a master device in some VRRP backup groups and be a backup device in some other VRRP backup groups.

Figure 1:
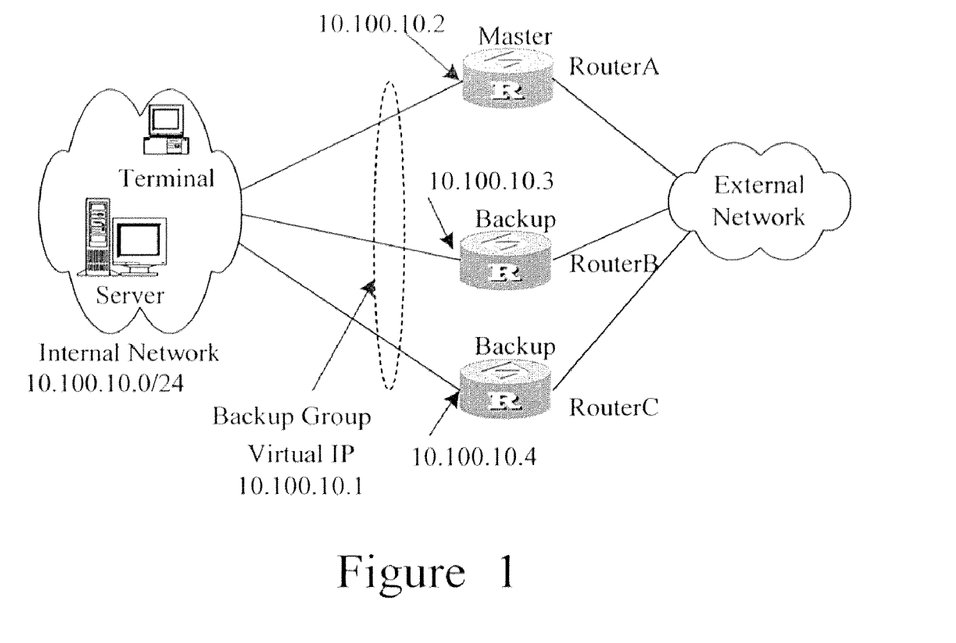
FIG. 1 schematically illustrates a networking structure for realizing multi-link backup based on the VRRP protocol according to prior arts.

As shown in FIG. 1, RouteA, RouteB and RouteC belong to a single VRRP backup group, and have the same virtual IP address 10.110.10.1. A device in the local area network sets this virtual IP address as the default gateway. At the beginning, RouteA is the master device of the VRRP backup group for the IP address associated with the virtual router, and is in charge of transmitting IP packets and sending VRRP advertisement packets periodically; RouteB and RouteC are backup devices, and monitor the advertisement packets from RouteA. The interval of the period is set in advance, usually in seconds.

Figure 2:
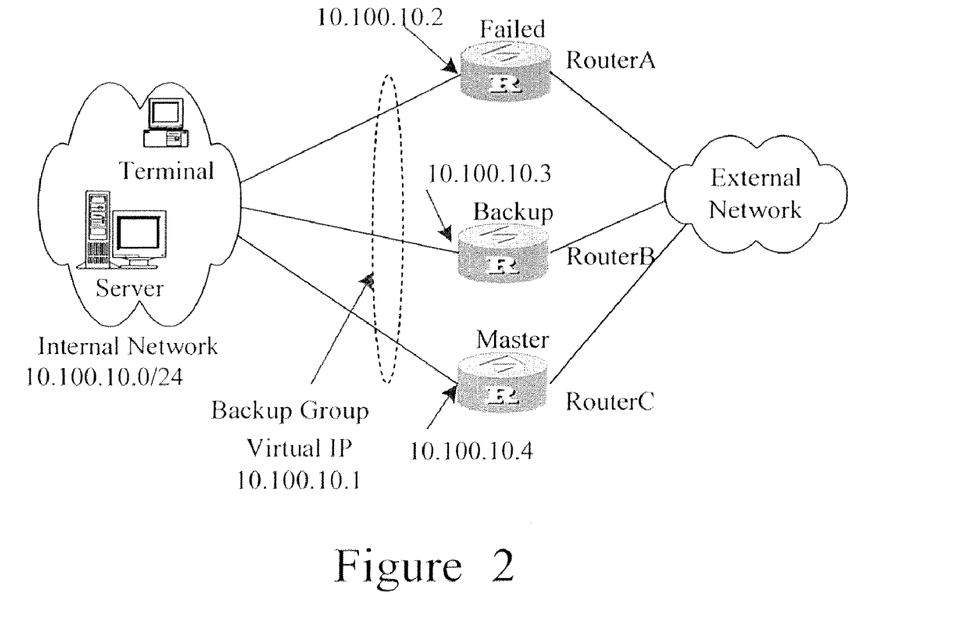
FIG. 2 schematically illustrates a networking structure after a transition between the VRRP master device and the backup device in FIG. 1 according to prior arts.

If, for some reason, there is a failure in RouteA or in the link from RouteA to the internal network, RouteB and RouteC will not be able to receive the VRRP advertisement packet. If a backup device has not received a VRRP advertisement packet for a threshold number of consecutive intervals, the backup devices RouteB and RouteC will compete to be a new master device; and eventually one of them will transit to the Master state and transmit packets. The threshold number is set in advance. After a transition has occurred, the networking structure of FIG. 1 turns into the networking structure of FIG. 2.

Figure 3:
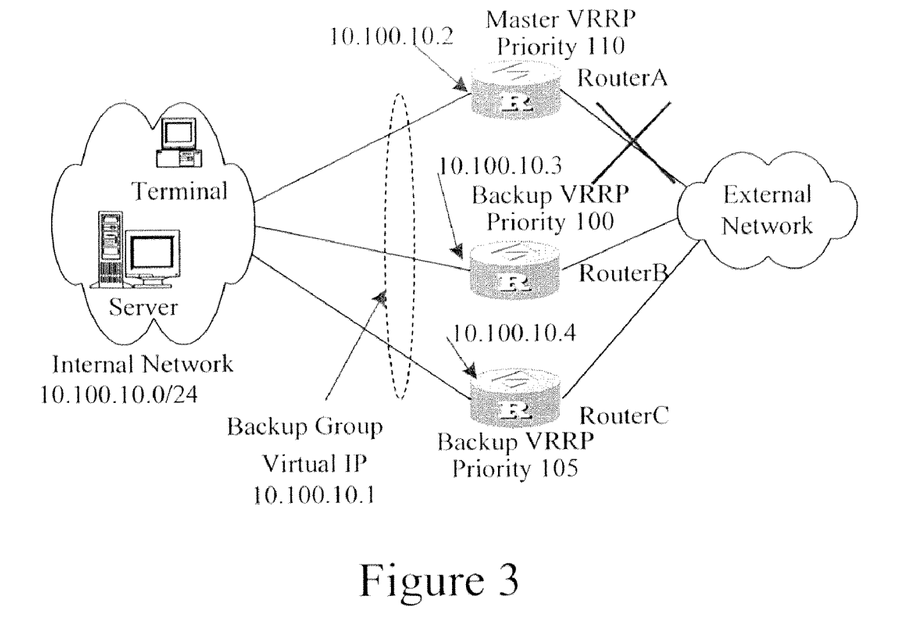
FIG. 3 schematically illustrates a networking structure of multi-link backup in the case of an up-link failure according to prior arts.
Figure 4:
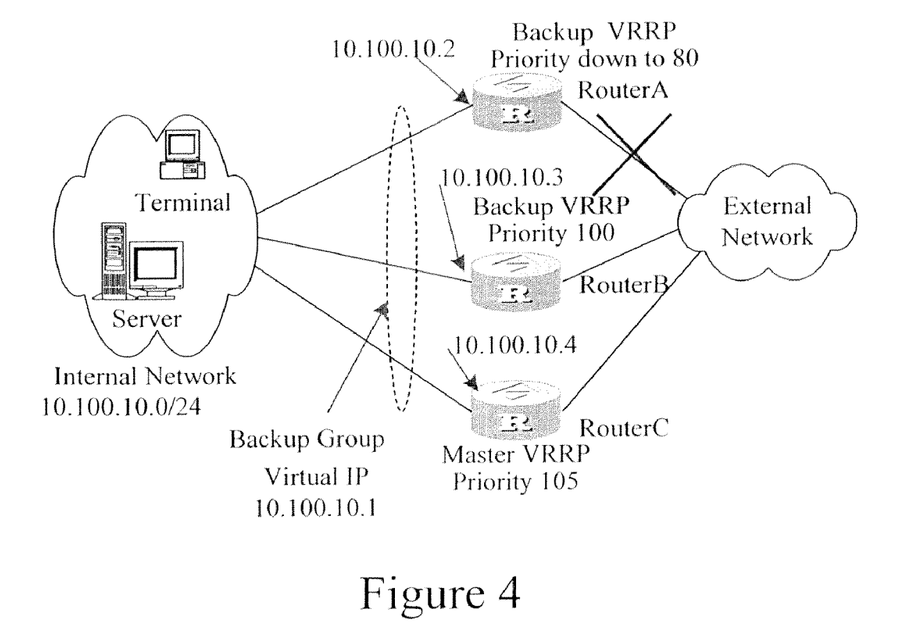
FIG. 4 schematically illustrates a networking structure after a transition in FIG. 3 according to prior arts.

When it is a failure of RouterA that results in the transition, the link from RouterA to the external network will be disconnected, and the packet returned from the external network will arrive in the internal network through RouterB or RouterC. When it is a failure in the link between the RouterA and the internal local area network that leads to the transition, in the case that the packet returned from the external network to the internal network has been forwarded to RouterA, the proper packet transmission may be guaranteed by notifying the upstream device to perform a route transition through configuring a dynamic route protocol, or by forwarding the packets between routers If there is neither a failure in the master device RouterA nor a failure in the link from the master device to the internal network, and the link from the master device to the external network is in failure, as shown in FIG. 3, as being configured with a VRRP monitoring interface, the VRRP backup group member can modify its own priority according to the connection state of the monitored interface. For example, the monitoring interface configured in the RouterA monitors the uplink interface between RouterA and the external network. Once the uplink interface is in failure, RouterA will lower its own priority, e.g., lower its own priority by 30. Because the member with the highest priority becomes a master device in the VRRP backup group, another VRRP backup group member will become the master device as its priority is higher than that of the current master device, and a networking structure after such a transition is shown in FIG. 4.

Though VRRP can provide route backup of the local area network, it cannot guarantee the normal operation of network due to its limitation in supporting evolving networking environments. The evolving networking environments include: reliability networking based on state firewall, reliability networking based on Network Address Translator (NAT) gateway and reliability networking based on Proxy server. A common characteristic of these networking environments is a consistency of the to-and-fro paths of a particular session, i.e. the to-and-fro packets must pass a same inter-network device.

The characteristic is described hereinafter by taking firewall as an example.

Figure 5:
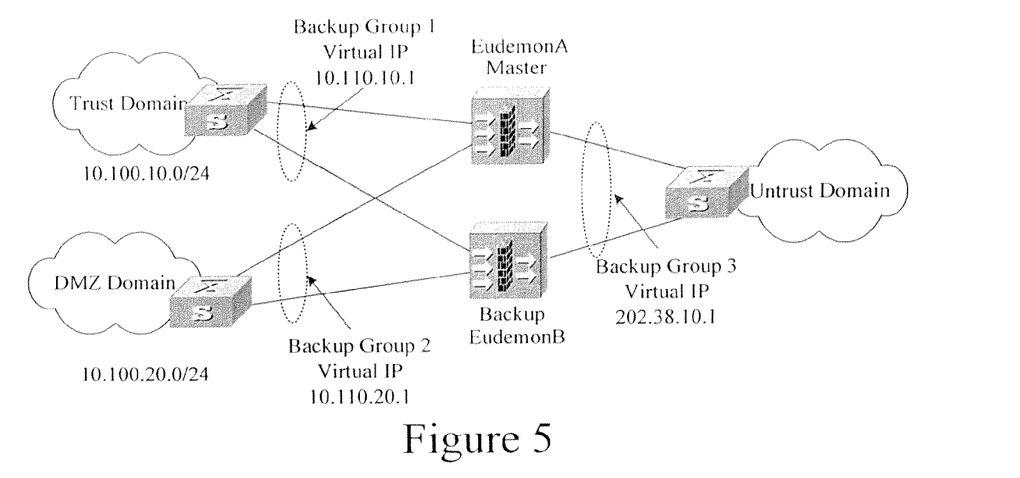
FIG. 5 schematically illustrates a networking structure including firewalls and based on VRRP according to prior arts.

As shown in FIG. 5, the firewalls EudemonA and EudemonB use three VRRP backup groups to perform route backup between different local area networks. Supposing that the master device of VRRP backup group 1 is EudemonA and the master device of VRRP backup group 3 is EudemonB, the network connection between a Trust domain which is located in the 10.100.10.0 network segment and an Untrust domain which is located in the 202.38.10.0 network segment will disconnect. The reason is as follows: a packet from the Trust domain to the Untrust domain will pass EudemonA; when a packet reaches EudemonA, if the packet is a first packet and is allowed to be forwarded to the external network, a session table will be established in EudemonA and the packet will pass FudemonA to the Untrust domain. Meanwhile the packet returned from the Untrust domain to the Trust domain will reach EudemonB instead of EudemonA while the EudemonB has no corresponding session table information and the packet is not a first packet, so the packet can not match the session table properly and will be discarded by the firewall, which will result in network disconnection.

Besides the state firewall, all the inter-network devices related to dynamic states require the consistency of to-and-fro paths because they dynamically generate state information of every session. But the state of a VRRP backup group member is only impacted by its own configuration and by the configuration and state of the other members in the VRRP backup group. Therefore, VRRP itself cannot provide the consistency of VRRP backup groups. As a result, reliable transmission of services requiring the consistency of to-and-fro paths cannot be guaranteed.

In addition, although a certain relationship among VRRP backup groups may be established through configuring monitoring interfaces, the corresponding configuration complexity will result in more workload, and the VRRP state consistency among VRRP backup groups still cannot be guaranteed.

SUMMARY OF THE INVENTION

An embodiment of the present invention provides a method for managing Virtual Router Redundancy Protocol backup groups, which enables states of routers in different VRRP backup groups to be shared, thus a reliable transmission of services requiring the consistency of to-and-fro paths is guaranteed.

The method for managing Virtual Router Redundancy Protocol backup groups includes:

Setting a VRRP Group Management Protocol (VGMP) group including at least one VRRP management group, in which each VRRP management group includes at least one VRRP member, and the VRRP members belonging to one VRRP management group belong to different VRRP backup groups, respectively;

managing uniformly the included VRRP management groups.

As can be seen from the above, in accordance with embodiments of the present invention, multiple VRRP backup groups may be managed based on a new VGMP protocol so as to guarantee the state consistency among multiple VRRP backup groups, i.e. the state change of a member in a certain VRRP backup group can be learned by other VRRP backup groups, and these other VRRP backup groups can adjust their own states accordingly. Thus, transmission of services requiring the consistency of to-and-fro paths in the network can be realized. Meanwhile in accordance with the embodiments of this invention, the switching delay of the VRRP may be reduced so as to meet the demands of a telecommunication level carrier network when the VPRP performs route backup. Furthermore, the interaction of VRRP health degree examination messages between devices of multiple VRRP backup groups can be reduced so as to decrease costs of system resources and improve communication performance.

DETAILED DESCRIPTION OF THE PREFERRED EMBODIMENTS

The embodiments of the present invention are hereinafter described in detail with reference to the accompanying drawings to make clear the technical scheme and advantages of the present invention.

An embodiment of the present invention provides a new manner for managing VRRP groups. It is necessary to extend the existing VRRP protocol and put forward a new protocol. Such a protocol is called VRRP Group Management Protocol (VGMP) for convenience. The embodiments of the present invention are hereinafter described with reference to the corresponding frame of the VGMP protocol.

The VGMP is used for coordinating and managing the state consistency of VRRP members in different VRRP backup groups. In an actual networking application, VRRP members requiring a same state are added to a VRRP management group, and one or more than one VRRP management groups constitute a VGMP group. VGMP group guarantees the state consistency of the included VRRP management groups, and each VRRP management group guarantees the state consistency of the included VRRP members thereof.

Figure 6:
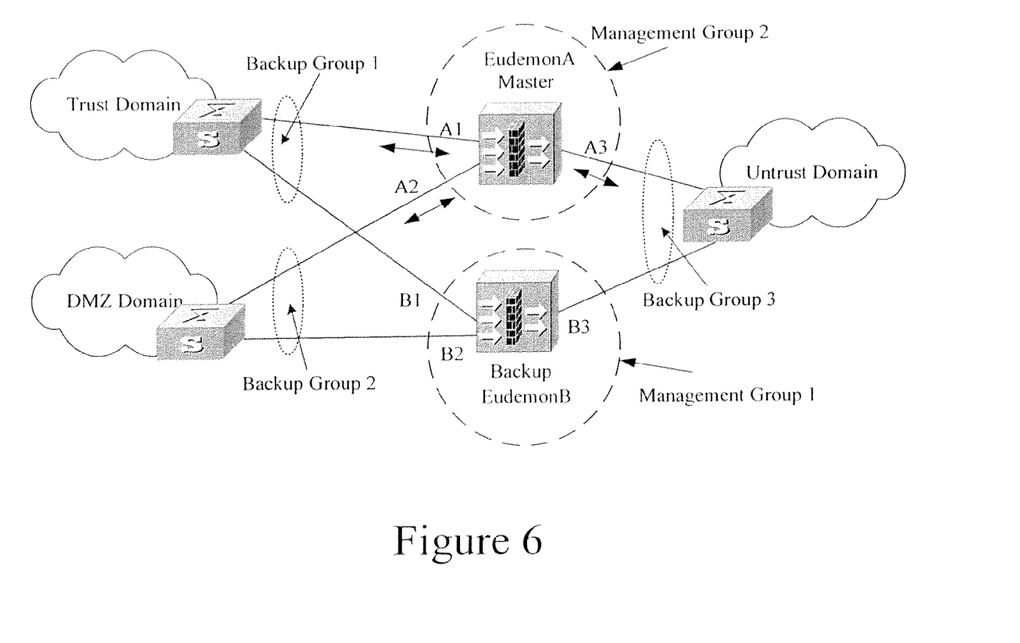
FIG. 6 is a diagram schematically illustrating an embodiment of the present invention.

As shown in FIG. 6, configured VRRP management groups are generally illustrated by dashed lines surrounding firewalls. One VRRP management group manages some VRRP members, and each member belonging to one VRRP management group belongs to different VRRP backup groups, respectively. Related VRRP management groups, which need to be coordinated by the VGMP, constitute a VGMP group.

VRRP management groups may be categorized into master VRRP management group and backup VRRP management group according to their working states. VRRP members in the master VRRP management group are all in the Master state, and VRRP members in the backup VRRP management group are in the Backup state. That is, the master VRRP management group is used for uniformly managing the state of each VRRP member of the master devices, the backup VRRP management group is used for uniformly managing the state of each VRRP member of the backup devices. In FIG. 6, VRRP management group 1 is a backup VRRP management group, and VRRP management group 2 is a master VRRP management group. It must be noticed that, the master VRRP management group and the backup VRRP management group are not absolute, i.e., a particular VRRP management group may be a master VRRP management group in one period of time, and may be a backup VRRP management group in another period of time. Additionally, there is only one master VRRP management group in a particular VGMP group.

It must be noted as well that, FIG. 6 shows the case that there is only one VRRP management group in the master device EudemonA and the backup device EudemonB, respectively. In this case, there is also only one VGMP group which includes VRRP management group 1 and VRRP management group 2. In practice, there may be more than one VRRP management group belonging to different VGMP groups in one device, and one particular VGMP group manages some VRRP management groups belonging to different devices. VRRP members requiring a same state are added to one VRRP management group; VRRP management groups needing to be coordinated constitute one VGMP group; the VGMP group is in charge of coordinating states of the included VRRP groups. The VGMP protocol is enabled between the master device and the backup device to perform the interaction of state management messages of VRRP members so as to accelerate the maintenance and the transition of states.

In accordance with an embodiment of the present invention, the VRRP management group in a VGMP group has three basic states:

Master, meaning that VRRP members of the VRRP management group are all in the state;

Backup, meaning that VRRP members of the VRRP management group are all in the Backup state; and Initialize, meaning that VRRP members of the VRRP management group are all in the Initialize state.

One VRPR management group may be a master VRRP management group or a backup VRRP management group; and in one device, there may be multiple VRRP management groups belonging to different VGMP groups. However, it must be noted that the states of each VRRP member of one VRRP management group in one device are consistent.

In accordance with an embodiment of the invention, the following VRRP member state management messages are defined to perform the interaction of the state information between VRRP management groups in one VGMP group, so as to uniformly manage the states of VRRP members of each VRRP management group.

1. Hello message, i.e., a handshake message, for issuing state information of the VRRP management group sending the message, and for additionally sending the state information of all the VRRP members managed by the VRRP management group sending the Hello message.

2. Hello Reply message, i.e., a handshake response message, for responding the received Hello message, and for additionally sending the state information of all the VRRP members managed by the VRRP management group sending the Hello Reply message.

3. VRRP Change message, i.e., a VRRP update message, for carrying the state change information of the managed VRRP members to trigger a response to the counterpart device, so as to accelerate the state transition operation of the VRRP members of the counterpart device.

4. VRRP Change Reply message, i.e., a VRRP update response message, for responding the VRRP Change message.

5. VGMP Change Req message, i.e., a negotiation message between VRRP management groups, for negotiating the VGMP Master state and the VGMP Backup state between the master device and the backup device running the VGMP protocol.

6. VGMP Change Ack message, i.e., a negotiation response message between VRRP management groups, for a positive response to the VGMP Change Req message.

7. VGMP Change Nack message, for a negative response to the VGMP Change Req message.

Because a VRRP management group is corresponding to a device, the above messages are interacted between devices actually. During the message interaction between devices, any interface can be employed for communicating between devices, and there is no limitation set in accordance with the embodiments of the invention.

VGMP packets corresponding to the above messages include the following contents in general.

(1) A VGMP packet head, a version No. and a packet length.

(2) The number of VRRP member information segments carried in the VGMP packet, the VRRP member information segment includes a VRRP identity and a VRRP current state. The VRRP ID, expressed by an interface identity (ID) and a VRRP IDF generally, is used for expressing the identities and the state information of the VRRP members managed by the VGMP and the related members thereof.

The packet, carrying the above information, is communicated between devices where different VRRP management groups are located, so as to realize the state consistency of VRRP members included in the master VRRP management group corresponding to the master device and VRRP members included in the backup VRRP management group corresponding to the backup device.

Based on the above-defined messages for VRRP member state management, the working modes of the VGMP according to an embodiment of the invention may include a management mode and a monitoring mode, which will be hereinafter described, respectively.

(1) Management mode: The management mode is used for maintaining the state consistency of VRRP management groups managed by the VGMP group. The consistency firstly means guaranteeing all the VRRP members of the master VRRP management group managed by the VRRP management group are in the same state and all the VRRP members of the backup VRRP management group are in the same state as well. The same state refers to a Master state or a non-Master state, namely, a Backup state or an Initialize state. The consistency also means the state coordination between VRRP management groups in one VGMP group, i.e., the transition between the Master state and the non-Master state.

Corresponding VRRP member state management messages of the management mode may include:

Hello message and Hello Reply message, as well as VGMP Change Req message, VGMP Change Ack message and VGMP Change Nack message.

The state consistency of VRRP members of each VRRP management group in the VGMP group can be maintained with the above messages.

In a practical application, the state of VRRP management group in the VGMP group can be controlled flexibly through a VGMP priority. For example, the VRRP management group with a higher VGMP priority is the master VRRP management group, the state of the VRRP members in this VRRP management group is the Master. It is permitted, however, that the state of the VRRP members in the master VRRP management group be the Initialize state.

In the management mode, a VRRP management group may guarantee the state consistency of all the VRRP members managed by itself. The working principle of the management mode is described hereinafter with reference to FIG. 7, which is based on FIG. 6, namely, there is only one VGMP group.

Figure 7:
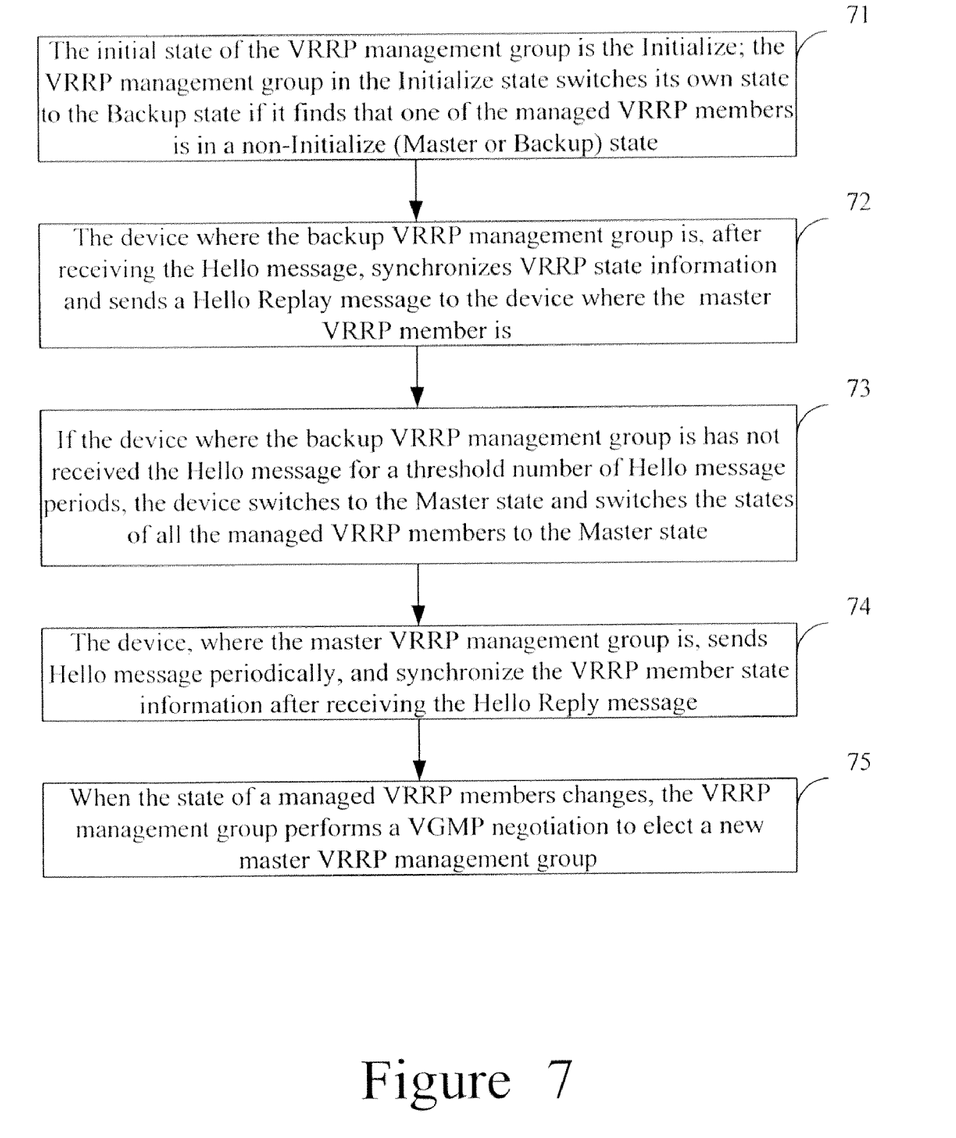
FIG. 7 is a diagram illustrating the working principle of the management mode according to an embodiment of the present invention.

Step 71: the initial state of the VRRP management group in the VGMP group is the Initialize state. The VRRP management group in the Initialize state switches its own state to the backup state if one of the managed VRRP members is in a non-Initialize (Master or Backup) state.

Step 72: the backup VRRP management group, after receiving the Hello message and synchronizing the VRRP state information, sends a Hello Reply message to the master VRRP management group, namely the VRRP management group sending a Hello message.

Step 73: if the backup VRRP management group has not received a Hello message for a threshold number of Hello message periods, it regards that the current master VRRP management group failed. At this point, the backup VRRP management group needs to negotiate with the other backup VRRP management groups of the VRRP management group to elect a new master VRRP management group. The threshold number is set in advance.

Step 74: the master VRRP management group sends the Hello message periodically, and synchronizes the VRRP member state after receiving a Hello Reply message.

Step 75: when the state of a managed VRRP member changes, the VRRP management group performs a VGMP negotiation to elect a new master VRRP management group, which includes the following steps:

When states of the VRRP members managed by the master VRRP management group change due to interface deactivation, the backup VRRP management groups are triggered to negotiate with each other, i.e., to negotiate through sending VGMP Change Req message and VGMP Change Ack/VGMP Change Nack message to elect a new master VRRP management group.

When states of the VRRP members managed by the backup VRRP management group change due to interface activation, the backup VRRP management group is triggered to negotiate with the master VRRP management group to elect a new master VRRP management group.

In accordance with an embodiment of the invention, the master VRRP management group ensures that the VRRP members managed by itself are all in the Master state, except those changing to the Initialize state because of interface deactivation. Similarly, the backup VRRP management group ensures the VRRP members managed by itself are all in the non-Master state.

As can be seen, the management mode can guarantee the state consistency of VRRP members in one VRRP management group and the state consistency among VRRP management groups in one VGMP group so as to realize the state consistency of VRRP members in an inter-network device, e.g., a firewall.

As can be seen from the above, in the management mode, if a VRRP member in the master VRRP management group fails, the backup VRRP management group cannot perform subsequent switching until it has waited for the threshold number of Hello message periods. In some cases, the switching delay in this magnitude cannot meet the demands of actual applications. The switching delay may be shortened through modifying the period of sending the message, e.g. the Hello message; but large numbers of VRRP messages will be generated and system workload will be increased. In this case, a monitoring mode can be adopted to shorten the switching delay and to decrease system workload.

(2) Monitoring mode: The monitoring mode is used to maintain the relationship of VRRP management groups between two devices and trigger the state updating of a VRRP management group. When there is failure in one VRRP member in the master VRRP management group, the master VRRP management group, where the failure VRRP member is located, notifies the corresponding VRRP management group in the counterpart device immediately; the VRRP management group in the counterpart device finds a VRRP member belonging to the same VRRP backup group as the failed VRRP member, and switch the state of the found VRRP member to the Master state so as to shorten the delay of switching the Master state and the Backup state of VRRP member.

Corresponding VRRP member state management messages in the monitoring mode include:

Hello message and Hello Reply message, as well as VRRP Change message and VRRP Change Reply message.

Figure 8:
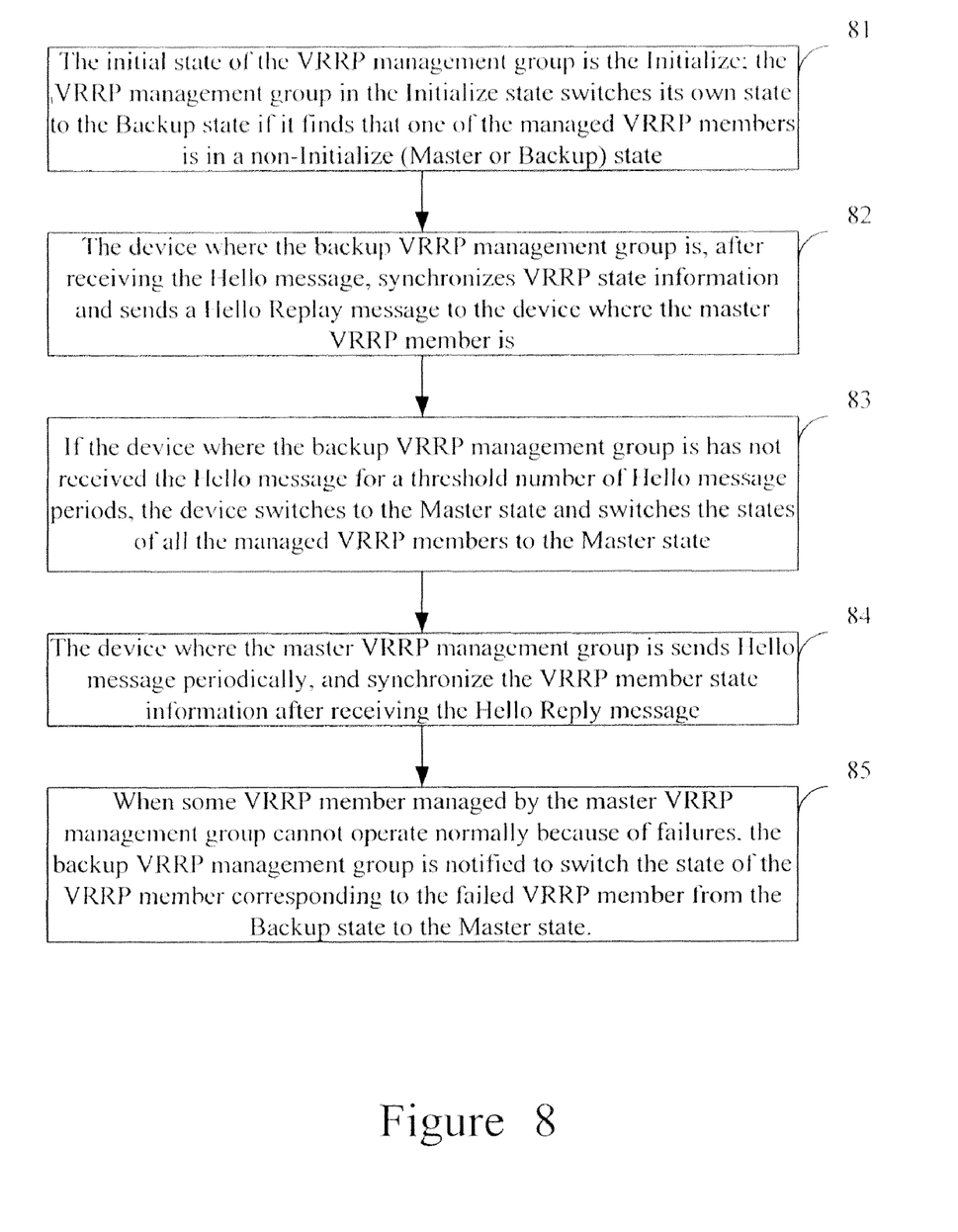
FIG. 8 is a diagram illustrating the working principle of the monitoring mode according to an embodiment of the present invention.

In the monitoring mode, the VRRP management group monitors the state updating for use in triggering a VRRP member, and does not need to guarantee the state consistency of the managed VRRP members. The working principle of the monitoring mode is shown in FIG. 8, which mainly includes the following steps.

Step 81: the initial state of VRRP management group managed by the VGMP is the Initialize.

The VRRP management group managed by the VGMP in the Initialize state switches its own state to the Backup state if one of the managed VRRP members is in a non-Initialize state, i.e., Master or Backup.

Step 82: the device, where the backup VRRP management group is located, synchronizes VRRP state information and sends a Hello Reply message to the master device after receiving a Hello message.

Step 83: if the device where the backup VRRP management group is located has not received a Hello message for a threshold number of Hello message periods, it will switch its own state to the Master state, and switch the states of all the managed VRRP members to the Master state. The threshold number is set in advance.

Step 84: the device where the master VRPP management group is located sends a Hello message periodically, and synchronizes the VRRP state information after receiving a Hello Reply message.

The Steps 81 to 84 are similar to the Steps 71 to 74 on the whole.

Step 85: when some VRRP member managed by the master VRRP management group cannot operate normally because of failure, the backup VRRP management group is notified to switch the state of the VRRP member corresponding to the failed VRRP member from the Backup state to the Master state.

As can be seen, in the monitoring mode, a VRRP management group controls only the state transition of the VRRP members managed by itself, while the state of the VRRP management group will not be switched, which is different from the VRRP management group in the management mode. In the management mode, when there is a failure in the interface, according to the previous processing mechanism, the VRRP backup device cannot switch until it has waited for a period in second magnitude. However, in the monitoring mode, the VGMP notifies the counterpart device of the state of the VRRP member, and the counterpart device switches the state of the VRRP member corresponding to the failed VRRP member to the master state. That is, the state updating of a VRRP member can be triggered in real time, which results in the switching delay of only milliseconds.

In accordance with an embodiment of the invention, if, in a device of any VRRP management group state, there is a state change of a master VRRP member because of interface deactivation, the counterpart device is notified to switch the state of corresponding VRRP management group to the Master.

According to the above principle, when the VRRP is used for router backup, the switching delay between VRRP members can be shortened. Meanwhile, it is possible to effectively decrease costs of system resources through the health degree examination via packets of the VRRP member state management messages.

In order to better understand this invention, an embodiment of this intention will be described in detail with reference to the accompanying drawing, as shown in FIG. 6. The application of the state firewall is again taken as an example.

As shown in FIG. 6, three interfaces of the firewall are connected with Trust domain, Untrust domain and DMZ domain, respectively, and VRRP is employed to realize the backup with three VRRP backup groups. Since there is special requirement by the state firewall on a session path as described above, all the VRRP members on the master firewall in the networking structure must be in the Master state and all the VRRP members on the backup firewall must be in the Backup state. An embodiment of the invention guarantees the state consistency o VRRP members on each interface.

This invention is applicable to devices requiring the consistency of to-and-fro paths, such as state firewalls, NAT devices, Proxy devices, application gateways and the like. The embodiments of the invention can guarantee the state consistency of uplink/downlink VRRP members of the corresponding device, thereby ensuring that both the uplink message and downlink message pass the same device, namely, meeting the demand for consistency of to-and-fro paths.

Meanwhile, the embodiments of the invention can realize rapid state transition of the corresponding VRRP member in the device. In the prior art, when there is failure in the master device, the backup device cannot switch until it has waited for a period of time generally in second magnitude, which cannot meet the demands of the telecommunication level transition. According to an embodiment of the invention, the interface deactivation of the master device can be learned by the corresponding backup device, and the switching process can be performed rapidly, thus, the corresponding switching delay can be shortened to millisecond magnitude so as to meet the demands of the telecommunication level transition.

In an actual application, as shown in FIG. 6, three interfaces of the firewall are connected with Trust domain, Untrust domain and DMZ domain, respectively, and VRRP is employed to realize the backup with three VRRP backup groups. In order to manage every VRRP backup group conveniently, the VRRP members of the three VRRP backup groups configured in the firewall are added to one VRRP management group as a VRRP management group in the VGMP group. It is supposed that, in the case of normal operation, the VRRP management group in the firewall EudemonA is in the Master state and the VRRP management group in the firewall EudemonB is in the Backup state.

Based on the above configuration, if there is failure in a certain link of the firewall, for example, link A1 is in failure as shown in FIG. 6, a VRRP Change message will be sent to the VRRP management group through the VGMP data channel, namely to a VRRP management group in the EudemonB. After that, a uniform state transition is performed, the states of all the VRRP members in the EudemonA will be switched to the Backup state, and the states of all the VRRP members in the EudemonB will be switched to the Master state. In this way, to-and-fro messages will all pass EudemonB to guarantee the consistency of the to-and-fro paths.

Owing to timely detection and processing of link state, the response time of a link failure is shortened, and is less than that needed in the existing failure detection mechanism; thus the response speed is improved.

In sum, the embodiments of the invention guarantee the state consistency of multiple VRRP groups in the devices requiring the consistency of to-and-fro paths in networks by using VRRP management groups, i.e., managing multiple VRRP backup groups in the devices based on the VGMP protocol. Furthermore, the embodiments of the invention make it possible to decrease switching delay of VRRP, and meet the demands of telecommunication level carrier network when the VRRP is used for route backup. In addition, the embodiments of the invention can decrease the number of VRRP health degree examination messages between devices with multiple VRRP groups so as to reduce costs of system resources.

It should be appreciated that the foregoing is only preferred embodiments of the present invention and is not to be used for limiting the invention. Any modification, equivalent substitution, and improvement without departing from the spirit and principle of this invention should be covered in the protection scope of the invention.

What is claimed is:

1. A method for managing Virtual Router Redundancy Protocol (VRRP) backup groups, comprising:
    setting a VRRP Group Management Protocol (VGMP) group comprising a master VRRP management group and at least one backup VRRP management group; adding VRRP members requiring state consistency of different VRRP backup groups to one VRRP management group, wherein each VRRP management group includes at least one VRRP member, and if there are multiple VRRP members belonging to one VRRP management group, the multiple VRRP members belong to different VRRP backup groups respectively; and
    managing uniformly, by the VGMP group, a state of each of the at least one VRRP member belonging to one of the at least one VRRP management group, performing a message interaction between VRRP management groups within one VGMP group, coordinating states between the master VRRP management group and the at least one backup VRRP management group, and keeping the state of the at least one VRRP member belonging to one VRRP management group consistent.

2. The method according to claim 1, comprising:
    setting a handshake message, a handshake response message and a handshake message period;
    wherein, performing the message interaction between the VRRP management groups within one VGMP group and coordinating the states between the master VRRP management group and the backup VRRP management group comprises
    sending, by the master VRRP management group, the handshake message according to the handshake message period,
    after receiving the handshake message, synchronizing, by the backup VRRP management group, state information and sending the handshake response message to the master VRRP management group, and
    after receiving the handshake response message, synchronizing, by the master VRRP management group, the state information.

3. The method according to claim 2, further comprising:
    setting a threshold number;
    wherein, the performing the message interaction between the VRRP management groups within one VGMP group and coordinating the states between the master VRRP management group and the backup VRRP management group further comprises
if the backup VRRP management group does not receive the handshake message for threshold number of handshake message periods, determining that the current master VRRP management group cannot operate normally, and negotiating with the other backup VRRP management groups within the VGMP group to elect a new master VRRP management group.

4. The method according to claim 1, wherein performing the message interaction between the VRRP management groups within one VGMP group and coordinating the states between the master VRRP management group and the backup VRRP management group further comprises:
if state of a member in a backup VRRP management group changes after being activated, negotiating with the current master VRRP management group to elect a new master VRRP management group.

5. The method according to claim 1, wherein managing the state of each of the at least one VRRP members belonging to one of the at least one VRRP management groups comprises:
in one VRRP group, when a state of any VRRP member changes, correspondingly updating states of the other VRRP members.

6. The method according to claim 5, wherein managing the state of each of the at least one VRRP members belonging to one of the at least one VRRP management groups comprises:
performing a message interaction between the VRRP management groups within one VGMP group, and coordinating states between a master VRRP management group and at least one backup VRRP management group.

7. The method according to claim 6, comprising:
setting a handshake message, a handshake response message and a handshake message period;
wherein, performing the message interaction between the VRRP management groups within one VGMP group and coordinating the states between the master VRRP management group and the backup VRRP management group comprises:
sending, by the master VRRP management group, the handshake message according to the handshake message period;
after receiving the handshake message, synchronizing, by the backup VRRP management group, state information and sending the handshake response message to the master VRRP management group; and
after receiving the handshake response message, synchronizing, by the master VRRP management group, the state information.

8. The method according to claim 7, further comprising:
setting a threshold number;
wherein the performing the message interaction between the VRRP management groups within one VGMP group and coordinating the states between the master VRRP management group and the backup VRRP management group further comprises
if the backup VRRP management group does not receive the handshake message for threshold number of handshake message periods, determining that the current master VRRP management group cannot operate normally, and negotiating with the other backup VRRP management groups within the VGMP group to elect a new master VRRP management group.

9. The method according to claim 6, wherein performing the message interaction between the VRRP management groups within one VGMP group and coordinating the states between the master VRRP management group and the backup VRRP management group further comprises:
if state of a member in a backup VRRP management group changes after being activated, negotiating with the current master VRRP management group to elect a new master VRRP management group.

10. The method according to claim 1, wherein managing the state of each of the at least one VRRP members belonging to one of the at least one VRRP management groups comprises:
when the VRRP member of the master VRRP management group cannot operate normally, notifying the backup VRRP management group within the same VGMP group, to switch the state of the VRRP member, the VRRP member belonging to the same VRRP backup group as the VRRP member that cannot operate normally, from a backup state to a master state.

11. The method according to claim 1, wherein the state comprises: a master state, a backup state and an initialize state.

* * * * *